US012607546B2

(12) United States Patent
Zhu et al.

(10) Patent No.: US 12,607,546 B2
(45) Date of Patent: Apr. 21, 2026

(54) DENSITY METER HAVING AT LEAST ONE MEASURING TUBE, AND METHOD FOR OPERATING AND METHOD FOR ADJUSTING A DENSITY METER OF THIS TYPE

(71) Applicant: Endress+Hauser Flowtec AG, Reinach (CH)

(72) Inventors: Hao Zhu, Freising (DE); Alfred Rieder, Landshut (DE)

(73) Assignee: Endress+Hauser Flowtec AG, Reinach (CH)

( * ) Notice: Subject to any disclaimer, the term of this patent is extended or adjusted under 35 U.S.C. 154(b) by 287 days.

(21) Appl. No.: 18/555,387

(22) PCT Filed: Mar. 21, 2022

(86) PCT No.: PCT/EP2022/057319
§ 371 (c)(1),
(2) Date: Oct. 13, 2023

(87) PCT Pub. No.: WO2022/218648
PCT Pub. Date: Oct. 20, 2022

(65) Prior Publication Data
US 2024/0210295 A1 Jun. 27, 2024

(30) Foreign Application Priority Data
Apr. 14, 2021 (DE) ..................... 10 2021 109 411.9

(51) Int. Cl.
*G01N 9/00* (2006.01)

(52) U.S. Cl.
CPC ....... *G01N 9/002* (2013.01); *G01N 2009/006* (2013.01)

(58) Field of Classification Search
CPC ......................... G01N 9/002; G01N 2009/006
(Continued)

(56) References Cited

U.S. PATENT DOCUMENTS

2017/0356833 A1* 12/2017 Eckert .................... G01F 1/8436
2019/0242738 A1* 8/2019 Zhu ......................... G01N 9/002

FOREIGN PATENT DOCUMENTS

DE        19652002 A1      6/1997
DE      102015122661 A1    6/2017
(Continued)

*Primary Examiner* — Peter J Macchiarolo
*Assistant Examiner* — Rodney T Frank
(74) *Attorney, Agent, or Firm* — Christopher R. Powers; Endress+Hauser (USA) Holding, Inc.

(57) ABSTRACT

A method for operating a density meter that includes at least one oscillating measuring tube for conducting a medium, an exciter disposed on the measuring tube for exciting oscillation modes of the at least one measuring tube, and a support body, wherein the measuring tube has inlet-side and outlet-side end portions that are connected to the support body, includes: exciting at least three oscillation modes of the measuring tube; determining eigenfrequency measurement values of the at least three oscillation modes; determining a density measurement value of the medium, taking into consideration a gas load that may be present; and determining a characteristic property of the at least one measuring tube on the basis of the eigenfrequencies of the three oscillation modes.

19 Claims, 2 Drawing Sheets

(58) Field of Classification Search
USPC .......................................................... 73/32 A
See application file for complete search history.

(56) References Cited

FOREIGN PATENT DOCUMENTS

| DE | 102016112002 A1 | 1/2018 |
| DE | 102018101923 A1 | 5/2019 |
| DE | 102018112002 A1 | 11/2019 |
| DE | 102019115215 A1 | 12/2020 |
| DE | 102019124709 A1 | 3/2021 |
| DE | 102019135299 A1 | 6/2021 |
| DE | 102020111127 A1 | 10/2021 |
| DE | 102020123999 A1 | 3/2022 |
| WO | 2012062551 A1 | 5/2012 |
| WO | 2016096243 A1 | 6/2016 |
| WO | 2019120780 A1 | 6/2019 |
| WO | 2020239319 A1 | 12/2020 |
| WO | 202205810 A1 | 1/2022 |

* cited by examiner

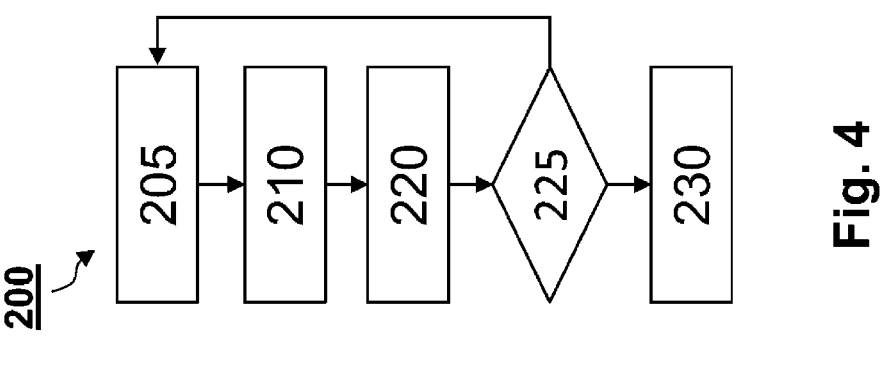
Fig. 4
Fig. 3
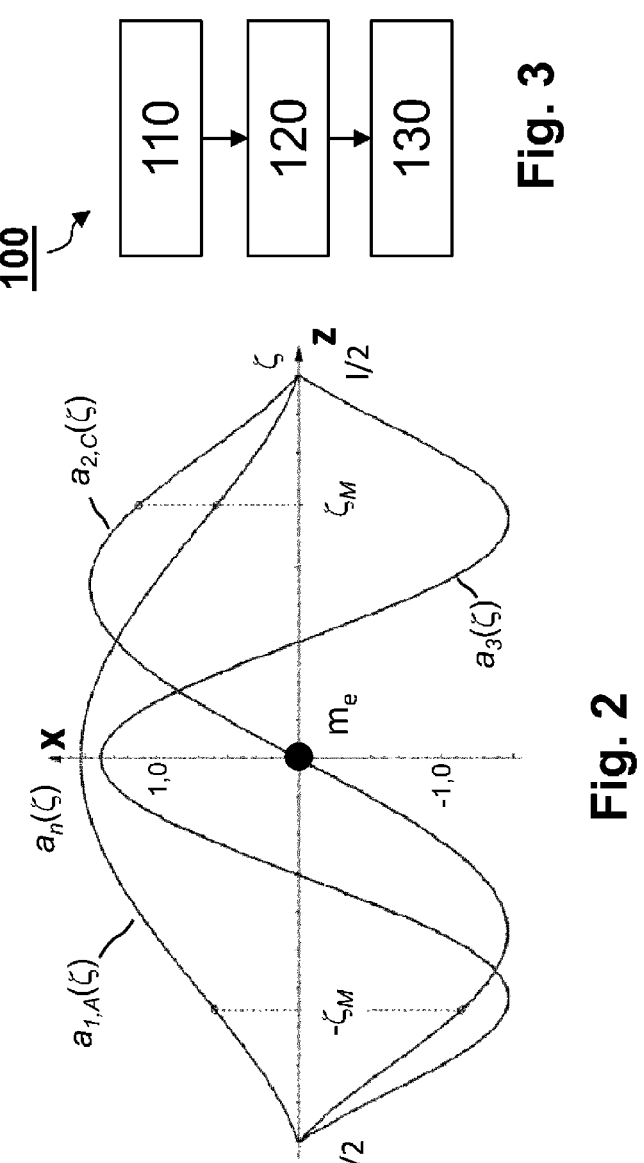
Fig. 2

DENSITY METER HAVING AT LEAST ONE MEASURING TUBE, AND METHOD FOR OPERATING AND METHOD FOR ADJUSTING A DENSITY METER OF THIS TYPE

CROSS-REFERENCE TO RELATED APPLICATIONS

The present application is related to and claims the priority benefit of German Patent Application No. 10 2021 109 411.9, filed Apr. 14, 2021, and International Patent Application No. PCT/EP2022/057319, filed Mar. 21, 2022, the entire contents of which are incorporated herein by reference.

TECHNICAL FIELD

The present invention relates to a density meter comprising at least one measuring tube and a method for operating and a method for adjusting such a density meter, wherein the density meter serves to determine a density measurement value of a medium conducted in the at least one measuring tube, in particular a liquid.

BACKGROUND

Under ideal conditions, such density meters have excellent measurement accuracy with a homogeneous, single-phase medium and a measuring tube in the original state. On the other hand, deviations from these ideal conditions, such as a multi-phase medium, formation of deposits, or removal of material from the measuring tube by abrasion or corrosion can impair the measurement accuracy. This circumstance is known per se, and for each of these deviations models are known for correcting the measurement errors associated with them of warning that measurement accuracy is impaired.

In order to compensate for the influence of the so-called resonator effect on the density measurement of media comprising a liquid loaded with gas, multi-frequency technology can be used, for example. Here, the first symmetric bending oscillation mode, the so-called $f_1$ mode, and the second symmetric bending oscillation mode, the so-called $f_3$ mode, are excited in order to determine, on the basis of the two associated eigenfrequencies, the sound velocity of the medium and a density measurement value corrected with respect to the influence of the gas load, as described in DE 10 2015 122 661 A1. If the $f_3$ mode, due to an excessive proximity of the resonant frequency of the medium to the eigenfrequency of the $f_3$ mode, can no longer be excited, the first antisymmetric oscillation mode ($f_2$ mode) can be used instead, the eigenfrequency of which lies between the eigenfrequencies of the $f_1$ mode and the $f_3$ mode.

A design of a vibration exciter that is advantageous in this regard is described in WO 2022/058 108 A1.

For the detection of a deposit, the damping of an oscillation mode can be evaluated, for example, as described in DE 10 2018 101 923 A1, wherein this only functions reliably when a gas load in a liquid medium can be ruled out. As soon as there is a gas load, the method described therein will no longer be able to reliably distinguish between gas load and deposit.

By monitoring the oscillation amplitude of the bending oscillation basic mode ($f_1$ mode) other than resonance, a change in a modal bending stiffness can be determined, as a result of which the effect of abrasion or corrosion can be determined, as is described, for example, in the as yet unpublished application DE 10 2019 124 709.8 and in WO 2012/062 551 A1. However, this procedure is very complicated, since amplitudes other than resonance can only be measured with great difficulty. Furthermore, amplitude measurement has cross-sensitivities to influencing factors on the measurement path, which have nothing to do with modal bending stiffness.

The as yet unpublished application DE 10 2020 111 127.4 describes a method for how a calibration factor calf, which is dependent on a modal bending stiffness of the $f_2$ mode, can be updated on the basis of a monitoring of this bending stiffness by means of amplitude measurement, and how damage to the measuring tube can be classified on the basis of a relationship between changes in the calibration factor and in the modal bending stiffness of the $f_1$ mode. As mentioned above, however, the informative value of amplitude measurement is limited by cross-sensitivities to other influencing factors on the measurement path.

The discussed prior art makes good contributions to the operation of Coriolis mass flow meters or to their operation as a density meter. However, it is essentially partial aspects that are addressed on the assumption of certain medium properties. The object of the present invention is to provide a more robust method for operating a density meter.

SUMMARY

The object is achieved by the method for operating a density meter and the method for adjusting a density meter according to the present disclosure.

The method according to the invention serves to operate a density meter which comprises at least one oscillating measuring tube for conducting a medium, and an exciter disposed on the measuring tube for exciting oscillation modes of the at least one measuring tube, at least one oscillation sensor and a support body, wherein the measuring tube has inlet-side and outlet-side end portions, which are connected to the support body, the method comprising the following steps:

exciting at least three oscillation modes of the measuring tube;

determining eigenfrequency measurement values of the at least three oscillation modes;

determining a density measurement value of the medium taking into consideration a gas load that may be present; and determining a characteristic property of the at least one measuring tube on the basis of the eigenfrequencies of the three oscillation modes.

In an embodiment of the invention, the characteristic property of the measuring tube comprises an effective wall thickness value or an effective material removal value of the measuring tube or an effective mass deposit value for a mass deposit on the wall of the measuring tube.

In an embodiment of the invention, the effective mass deposit value comprises a deposit thickness value which is determined as a function of a density value (PB) for a material of the mass deposit.

In an embodiment of the invention, the method further comprises detecting at least one parameter measurement value of at least one parameter to which at least one of the eigenfrequencies has a cross-sensitivity.

In an embodiment of the invention, the at least one parameter is selected from a list which comprises a temperature of the at least one measuring tube, a temperature of a support body, and a pressure of the medium conducted in the measuring tube.

The support body can comprise a body, in particular a metallic body, by which the at least one measuring tube is held in an inlet-side portion and in an outlet-side portion, in particular in order to suppress or minimize relative movements between the end portions of the measuring tube.

In an embodiment of the invention, the at least three oscillation modes are selected from a list which comprises the first symmetric oscillation mode ($f_1$ mode), the first antisymmetric oscillation mode ($f_2$ mode), the second symmetric oscillation mode ($f_3$ mode), the second antisymmetric oscillation mode ($f_4$ mode), the third symmetric oscillation mode ($f_5$ mode), and the third antisymmetric oscillation mode ($f_6$ mode). It is currently preferred to select the modes with the lowest modal bending stiffnesses. These are in most cases the $f_1$ mode, the $f_2$ mode and the $f_3$ mode.

In an embodiment of the invention, the bending oscillation modes are excited by scanning suitable frequency ranges and rules for a defined phase relationship between the oscillation amplitude and the exciter signal. The exciter can in particular be an exciter arranged symmetrically, except for manufacturing tolerances, with which exciter all symmetric bending oscillation modes can be efficiently excited. However, the antisymmetric oscillation modes cannot be reliably excited in the case of homogeneous media in the measuring tube. However, if the measuring tube is conducting a medium which has inhomogeneities, for example, due to a gas load or a solid phase, a symmetry break in the mass distribution can occur, so that an excitation of the antisymmetric modes, in particular the $f_2$ mode, is also possible. The excitation of the bending oscillation modes can also be carried out with a slightly eccentrically arranged exciter, as described, for example, in the as yet unpublished patent applications with the references DE 10 2020 111 127.4 and DE 10 2020 123 999.8. Furthermore, it is possible to apply an antisymmetric exciter signal to electrodynamic vibration sensors, which are arranged mutually symmetrically in relation to the center of the measuring tube in the longitudinal direction of the measuring tube, in order to excite the antisymmetric modes in this way.

In an embodiment of the invention, the method comprises solving an equation system of at least three equations of the type:

$$\rho_M = K(c, f_n)[A_n + B'_n(f_n)], \qquad (I)$$

wherein
$\rho_M$ is the media density,
K describes a correction function for the resonator effect, and
c is the sound velocity of the medium conducted in the tube.

The resonator effect denotes the effect of a forced oscillation of the medium against the measuring tube, whereby the observed eigenfrequency $f_n$ of a bending oscillation mode of the measuring tube is shifted. The strength of the resonator effect depends in particular on the ratio of the observed eigenfrequency of the measuring tube and the resonant frequency of the medium, the latter being proportional to the sound velocity of the medium, which decreases with an increasing gas load of the medium. The resonant frequency of the medium is usually a multiple greater than the observed eigenfrequency of the measuring tube. In this case, the eigenfrequency is lower than it would be without the resonator effect. Without correction of the resonator effect, an excessively high density measurement value would be output. In these cases, according to an embodiment of the invention for the correction function K for the resonator effect, $K \le 1$, the value 1 being approximated with increasing sound velocity of the medium. The correction function K goes to zero if the resonant frequency of the medium goes towards the eigenfrequency of the vibration mode being considered. In this case, however, an excitation of the oscillation mode is not possible.

In equation I, $A_n$ is a mode-specific function which depends on a characteristic property of the measuring tube and is independent of the respective eigenfrequency of a bending oscillation mode.

Furthermore, in equation I, $B'_n$ is a mode-specific function which depends on the at least one characteristic property of the measuring tube and on the respective eigenfrequency $f_n$ of a bending oscillation mode, wherein $B'_n$ is in particular a quotient of a mode-specific, frequency-independent function $B_n$ and the square of the respective eigenfrequency $f_n$.

According to an embodiment, the at least one characteristic property comprises an effective mass deposit or a deposit thickness b and/or an effective removal a of the material of the tube wall. According to an embodiment of the invention, a known value, in particular zero, is set for one of the two characteristic variables.

In an embodiment of the invention, the functions $A_n$ and $B'_n$ or $B_n$ have linear functions of the characteristic variables.

In an embodiment of the invention, the functions $A_n$ have a term which is dependent on an arrangement of at least one mass body on the measuring tube, the mass body in particular comprising the exciter. Insofar as the exciter has a non-negligible mass and is usually positioned at the location of the largest deflection of the measuring tube in the case of symmetric oscillation modes, which location coincides with an oscillation node of the antisymmetric oscillation modes, the consideration of the mode-specific influence of the vibrations by the exciter mass leads to a considerably more accurate determination of the characteristic variables of the measuring tube. In contrast, the masses of the oscillation sensors can be ignored.

In an embodiment of the invention, at least one of the functions $B'_n$ or $B_n$ has dependencies on parameters to which the density measurement has cross-sensitivities. According to an embodiment of the invention, these parameters are selected from a list which comprises a medium pressure, a medium temperature, and an ambient temperature.

In an embodiment of the invention, the functions $B'_n$ or $B_n$ have linear functions of the parameters.

In an embodiment of the invention, the functions $A_n$ and $B'_n$ or $B_n$ have linear functions of mode-specific coefficients, the latter being obtained with the method according to the invention for adjusting a density meter, wherein adjustment measurements with at least two media of different densities are determined, wherein the density of the first of the media under normal conditions differs from the density of the second of the media at least by a factor of 100, in particular at least by a factor of 400 and preferably at least by a factor of 800, wherein the media comprise in particular air and water, and wherein the eigenfrequencies of at least three vibration modes of the measuring tube were determined during the adjustment.

In an embodiment of the invention, the adjustment measurements are performed in each case at a plurality of values of the parameters to which the density measurement has a cross-sensitivity.

The density meter according to the invention comprises: at least one oscillating measuring tube for conducting a medium; at least one support body, wherein the at least one measuring tube is mechanically coupled to the support tube on the inlet side and on the outlet side in order to suppress relative movements between an inlet-side end portion and an outlet-side end portion of the measuring tube; at least one exciter, by means of which the at least one measuring tube can be excited to bending oscillations, at least one oscillation sensor for detecting bending oscillations of the at least one measuring tube, and an operation and evaluation circuit for feeding the exciter with an exciter current and for detecting and evaluating measurement signals of the at least one oscillation sensor, wherein the operation and evaluation circuit is configured to carry out the method according to the invention for operating a density meter, wherein the coefficients determinable by the method are stored in the coefficients which can be determined by the method.

In an embodiment of the invention, the measuring and operation circuit is configured to receive at least one parameter measurement value of the at least one parameter for which the measuring tube vibrations have cross-sensitivities, wherein the at least one parameter is selected from a list which comprises the pressure of the medium conducted in the measuring tube, a temperature of the measuring tube and a temperature of the support body.

BRIEF DESCRIPTION OF THE DRAWINGS

The invention is now explained in more detail on the basis of the exemplary embodiment shown in the figures. In the figures:

FIG. 1a shows a side view of an exemplary embodiment of a density meter according to the invention for implementing the method according to the present disclosure;

FIG. 1b shows a spatial representation of the exemplary embodiment of the density meter of FIG. 1a;

FIG. 1c shows a schematic representation of a cross-section of a measuring tube of a density meter according to the present disclosure with different characteristic variables having an influence on the vibration behavior of the measuring tube;

FIG. 2 shows a schematic illustration of bending lines of three vibration modes of a measuring tube;

FIG. 3 shows a flowchart of an exemplary embodiment of a method according to the present disclosure for operating a density meter; and FIG. 4 shows a flowchart of an exemplary embodiment of a method according to the present disclosure for adjusting a density meter.

DETAILED DESCRIPTION

Figures 1A, 1B, 1C:
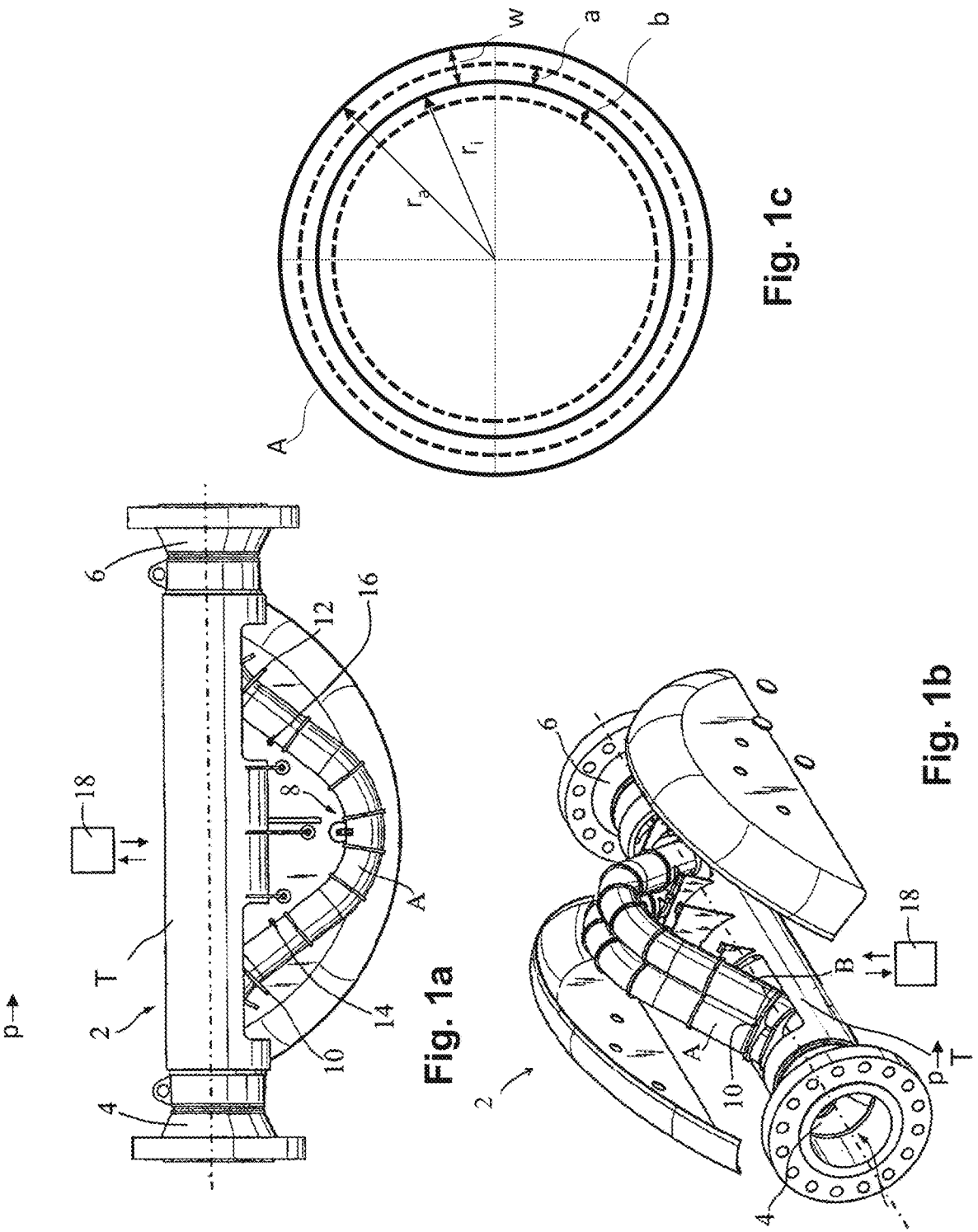

FIGS. 1a and 1b show an exemplary embodiment of a density meter 2 according to the invention, which is designed to carry out the method according to the invention. The density meter 2 is in particular also configured as a mass flow meter operating on the Coriolis principle to carry out a mass flow measurement in addition to the density measurement. The density meter 2 has two oscillatably mounted measurement tubes A and B, which respectively have an arcuate shape and extend in parallel to one another. The density meter 2 can be inserted into a pipe (not shown) in such a way that the fluid flowing in the pipe flows through the two measurement tubes A, B. At the inlet side and at the outlet side, the measuring tubes A, B are each enclosed in flow dividers or collectors 4, 6, the latter being rigidly connected to one another by a support tube T. The inlet-side and outlet-side end portions of the measuring tubes are thus also coupled to the support tube T, whereby relative movements between the inlet-side and outlet-side end portions of the measuring tubes are effectively suppressed. Arranged between the two measuring tubes A, B is an electrodynamic exciter 8 by means of which the two measuring tubes A, B can be excited to perform bending oscillations with respect to one another, wherein a free oscillation length of the measuring tubes A, B is defined by coupling elements 10, 11, with which the measuring tubes are mechanically coupled on the inlet side and on the outlet side. Between the two measuring tubes A, B, electrodynamic vibration sensors 14, 16 are arranged on an inlet-side portion and on an outlet-side portion. The density meter 2 further comprises an operation and evaluation circuit 18 for feeding the exciter 8 with an exciter current and for detecting and evaluating measurement signals of the electrodynamic vibration 6 sensors 14, 16. The density meter 2 further comprises a first temperature sensor (not shown here) which is arranged, for example, on the first coupling element 10 in order to determine a first temperature measurement value representative of the temperature of the measuring tubes A, B. The positioning of the first temperature sensor on the coupling element 10 is appropriate insofar as the coupling element is only connected to the measuring tubes A, B, so that the temperature of the coupling element is largely defined by the temperature of the measuring tubes. Likewise, the first temperature sensor can also be arranged on one of the measuring tubes, in particular outside the vibrating section delimited by the coupling elements, whereby a shorter response time of the first temperature sensor is achieved. The density meter 2 further comprises a second temperature sensor (not shown here), which is arranged on the support tube T, in particular on its inner lateral surface, in order to provide a second temperature measurement value representative of the temperature of the support tube. Differences between the temperature of the measuring tubes and the temperature of the support tube are caused by axial stresses which influence the vibration behavior of the measuring tubes A, B. For this reason, the measuring and operation circuit 18 is configured to detect measurement signals of the temperature sensors which represent the first and second temperature measurement values, and to take these into account when determining the media density according to the invention. Furthermore, the first temperature measurement value is included in the calculation of the temperature-dependent modulus of elasticity.

In order to carry out the method according to the invention, it is advantageous if the measuring and operation circuit has in addition an input for a pressure measurement value p in order to be able to take into account the medium pressure when performing the method according to the invention for operating the density meter.

Although FIGS. 1a and 1b show an exemplary embodiment of a density meter with a pair of measuring tubes curved in the rest position, the invention is equally applicable for density meters with a single measuring tube or with several pairs of measuring tubes. Similarly, instead of the illustrated measuring tubes, which are curved in the rest position, it is also possible for realizing the invention to use even S-shaped measuring tubes or straight measuring tubes in relation to a measuring tube transverse plane.

FIG. 1c shows a schematic cross-section through a measuring tube A of a density meter according to the invention. A measuring tube generally comprises a metallic material, in 4 particular a stainless steel or titanium. In principle, however, other materials are also suitable, for example, glass, ceramic, semiconductor materials such as silicon, or polymers. In its rest position, the measuring tube can have a straight or curved shape. The measuring tube A has a substantially circular cross-section with an outer radius $r_a$ and an initial inner radius $r_i$ under reference conditions, wherein the difference between the two radii defines a wall thickness w of the measuring tube. The two radii mentioned give the initial area moment of inertia $I_0$ of the measuring tube cross-section in the delivery state of the measuring device:

$$I_0 = \frac{\pi}{4} \cdot \left( r_a^4 - r_i^4 \right)$$

All modal stiffnesses of the measuring tube are proportional to the modulus of elasticity E and to the area moment of inertia I. The former describes a temperature-dependent material property, and the latter can change if material is removed by abrasion or corrosion from the wall of the measuring tube in a thickness a by the medium conducted in the measuring tube. The remaining area moment of inertia I can then be described as:

$$I = \frac{\pi}{4} \cdot \left( r_a^4 - (r_i + a)^4 \right)$$

A measuring tube cross-sectional area $A_M$ decreases to the extent that the material removal takes place, which is given as:

$$A_M = \pi \cdot \left( r_a^2 - (r_i + a)^2 \right)$$

The mass and thus the inertial forces of the measuring tube are proportional to this measuring tube cross-sectional area, just as is an axial force acting on the measuring tube. The aforementioned variables are therefore variable as a function of the material removal a.

Depending on the medium, a deposit with a layer thickness b can form on the measuring tube wall. The mass of this deposit is proportional to the deposit cross-sectional area $A_b$, which is given as:

$$A_b = \pi \cdot \left( (r_i + a)^2 - (r_i + a - b)^2 \right)$$

To the extent that the deposit has a density different from the medium, it can falsify density measurement.

The mass of the medium, or the mass on the basis of which the density measurement takes place, is proportional to the clear cross-section of the tube or to the cross-sectional area $A_f$ of the fluid:

$$A_f = \pi \cdot (r_i + a - b)^2$$

Although the above equations in the sense of generality contain both a contribution a for material removal and a contribution b for deposit formation, only one of the phenomena will occur in practice, i.e., at a specific measurement point, that is to say, either material removal, or deposit formation. By selecting the phenomenon, for example, during start-up, the non-applicable contribution can be set to zero.

Assuming that the wall thickness w, the material removal a, and the deposit formation b are low in relation to the radius, the following approximations result.

For the area moment of inertia:

$$I = \pi \cdot r^3 \cdot w \cdot \left( 1 - \frac{a}{w} \right)$$

Here, r is the inner radius of the measuring tube and w is its wall thickness.

For the measuring tube cross-section:

$$A_M = 2 \cdot \pi \cdot r \cdot w \cdot \left( 1 - \frac{a}{w} \right)$$

For the fluid cross-sectional area:

$$A_f = \pi \cdot r^2 \cdot \left( 1 + \frac{2a}{r} - \frac{2b}{r} \right)$$

For the deposit cross-sectional area:

$$A_b = 2 \cdot \pi \cdot r \cdot b$$

The above terms show how geometric variables relevant to the vibration behavior of a measuring tube change due to deposit formation and material removal.

A further aspect in modeling an oscillator with an oscillating measuring tube relates to its attachment parts, since their mass influences oscillation properties in a mode-dependent manner. In particular, the exciter mass me must be taken into account here because the exciter is usually positioned at an antinode of the symmetric oscillation modes and at an oscillation node of the antisymmetric oscillation modes. The inhomogeneous mass distribution along the measuring tube facilitates the identification of the various changes, of the measuring tube or of the medium, which cannot easily differ in the case of a homogeneous mass distribution. Insofar as the mode-specific kinetic energy of the exciter contributes to the mode-specific kinetic energy of the oscillator, it is advantageous to take these into account when modeling the oscillator. The mode-dependent ratio of the kinetic energies of exciter mass and measurement tube mass is given as:

$$r_{c0n} = \frac{m_E \cdot a_n^2(0)}{\rho_T \cdot \pi \cdot r \cdot w \cdot l}$$

Here, l is the measuring tube length, $\rho_T$ is the density of the measuring tube material, me is the exciter mass and $a_n(0)$ is the mode-dependent deflection at the measuring tube center, the deflection being normalized with a standardization factor. The mode-specific standardization factor is given as the square root of the integral $d\zeta$ of the deflection ratio $(a_n(\zeta))^2$, of the mode-specific bending line from the center of the measuring tube to an end of the measuring tube, i.e., from $\zeta=0$ to $\zeta=l/2$. Examples of bending lines of the first three bending oscillation modes of a straight measuring tube are shown in FIG. 2.

In addition to the above properties of the oscillator, medium properties are also to be taken into account, in particular the compressibility of the medium due to a gas load. As is known, the density value $\rho_M$ of a compressible medium is obtainable by multiplying a preliminary density value $\rho_{prel}$, which was determined using an incompressible medium, by a correction factor K, that is to say:

$$\rho_M = \rho_{prel} \cdot K(f_0, f_n),$$

wherein the correction factor K is given as:

$$K(f_0, f_n) = \cfrac{1}{K_0 + \cfrac{K_1}{1 - \left(\dfrac{f_n}{f_0}\right)^2}},$$

wherein $f_n$ is the eigenfrequency of the n-th oscillation mode of the oscillator, wherein $f_o$ is the resonant frequency of the medium oscillating in relation to the measuring tube, wherein $K_0$ and $K_1$ are weighting factors where $K_0 = 0.163$ and $K_1 = 1 - K_0$.

The resonant frequency $f_0$ of the medium is given in a first approximation as:

$$f_0 = \frac{c \cdot \lambda}{2\pi \cdot r},$$

wherein c is the sound velocity of the medium, and $\lambda$ is an eigenvalue with the value $\lambda = 1.842$.

The correction factor K can thus also be indicated as a function of the eigenfrequency of the n-th oscillation mode of the oscillator and the sound velocity of the medium oscillating in relation to the measuring tube, that is to say:

$$K(c, f_n) = \cfrac{1}{K_0 + \cfrac{K_1}{1 - \left(\dfrac{f_n}{\dfrac{c \cdot \lambda}{2\pi \cdot r}}\right)^2}}, \quad \text{(L1)}$$

To determine the media density, the eigenfrequencies $f_n$ of at least three vibration modes, in particular $f_1$, $f_2$ and $f_3$, must be excited and the following equation system must be solved:

$$\rho_M = K(c, f_n) \cdot [A_n + B'_n(f_n)] \quad \text{(L2)}$$

wherein the following apply:

$$A_n = c_{0n} \cdot \left[1 - \left(\frac{2}{r} + \frac{1}{w}\right) \cdot a + \frac{2}{r} \cdot b + r_{c0n} \cdot \left(1 - \frac{2}{r} \cdot a + \frac{2}{r} \cdot b\right)\right] - \rho_b \cdot \frac{2}{r} \cdot b, \quad \text{(L3)}$$

wherein $\rho_b$ denotes the deposit density, where:

$$B'_{n(f_n)} = B_n \cdot \frac{1}{f_n^2}, \quad \text{(L4)}$$

with:

$$B_n = (c_{1n} + c_{2n} \cdot T_M + c_{3n} \cdot T_T) \cdot \left(1 - \left(\frac{2}{r} + \frac{1}{w}\right) \cdot a + \frac{2}{r} \cdot b\right) + c_{4n} \cdot p, \quad \text{(L5)}$$

wherein $T_M$ and $T_T$ are the temperatures of the measuring tube and of a support body, the ends of the measuring tube being fixed to the support body, and p denoting the pressure of the medium. The temperatures mentioned and the medium pressure are measurement variables. The radius r and the wall thickness w are the initial values for the inner radius and wall thickness of the measuring tube. The density of the deposit $\rho_b$ is a medium-dependent material parameter that is to be provided when the method is applied for a medium in which deposit formation is to be expected. The coefficients $c_{0n}$, $c_{1n}$, $c_{2n}$, $c_{3n}$ and $c_{4n}$ are to be determined during an initial adjustment of the measuring device, as will be explained further below. In the equation system L2, in addition to the density value $\rho_M$ being sought, the sound velocity c, the material removal a, and the deposit thickness b are unknown variables, with a or b being able to be set to zero depending on the medium. Only three unknown variables thus remain, namely firstly the density value $\rho_M$, secondly the sound velocity c, and thirdly either the material removal a or the deposit thickness b, whereby the variables are to be determined on the basis of the three eigenfrequencies $f_n$.

If material removal is to be expected at a measuring point, this can now be determined precisely during the ongoing measurement operation, even during density measurement in the case of media with a gas load. The change in the measuring tube resulting from material removal, accompanied by a decreasing compressive strength, can be signaled, for example, by an alarm when a limit value is exceeded.

If the density meter is also designed as a Coriolis mass flow meter, the effect of material removal on a calibration factor calf for mass flow measurement can be taken into account, which sets a mass flow rate to be determined in relation to a measured time difference between the zero crossings of two oscillation sensors. In commonly used Coriolis mass flow meters, the first symmetrical bending oscillation mode, the so-called $f_1$ mode, is excited. In this case, the calibration factor is, in particular, the modal stiffness of the first antisymmetric bending oscillation mode, the so-called $f_2$ mode. Using the method according to the invention, a change in the calibration factor dependent on material removal can now be determined. In the simplest case, a decreasing measurement accuracy can then be signaled, or the calibration factor calf can be adjusted depending on the removal.

If, on the other hand, deposit formation is to be expected, this can also be signaled when a limit value is exceeded, for example, in order to initiate a cleaning of the measuring tube. The cleaning can now also take place in the installed state of the density meter, since the deposit thickness can be determined even during the cleaning process.

By determining the sound velocity, the invention thus offers the basis for determining a gas volume fraction in the medium irrespective of deposit or material removal.

The steps of the method 100 according to the invention for operating a density meter of the type described in conjunction with FIGS. 1a and 1b are shown in summary in FIG. 3. In a first step, the excitation 110 of at least three vibration modes of the measuring tube takes place. This is followed by the determination 120 of eigenfrequency measurement values $f_n$ of the at least three vibration modes. On the basis of these eigenfrequency measurement values $f_n$, the determination (130) of a density measurement value $\rho_M$ of the medium can be performed taking into account a possibly present gas load, and a characteristic property a, b of the at least measuring tube can be determined on the basis of the eigenfrequencies of the three oscillation modes by the above equation system L2 being solved.

The coefficients $c_{0n}$, $c_{1n}$, $c_{2n}$, $c_{3n}$ and $c_{4n}$ of the equation system are to be determined during an initial adjustment of the measuring device by applying air and water as the medium to the density meter, the eigenfrequency $f_n$ of at least three vibration modes being detected at a plurality of values for the temperatures $T_M$ and $T_T$ and the pressure p. Insofar as neither material removal nor deposit formation is present at this moment in time, the equation system L2 is simplified as follows:

$$\rho_M = K(c, f_n) \cdot \left[ c_{0n} \cdot (1 + r_{c0n}) + (c_{1n} + c_{2n} \cdot T_M + c_{3n} \cdot T_T + c_{4n} \cdot p) \cdot \frac{1}{f_n^2} \right] \quad (L6)$$

If the adjustment measurements are carried out with water at a sufficiently high operating pressure, which significantly exceeds the respective vapor pressure, $K(c, f_n)=1$ can be assumed for the correction factor. For the adjustment measurements with air, $K(c, f_n)=1$ can be calculated likewise across the board. Even setting the density of air at normal pressure to a constant value of 1.2 $kg/m^2$ across the board gives sufficiently accurate results.

For the density of water, temperature- and pressure-dependent reference values are to be set in accordance with the required accuracy in each case.

To calculate the mode-dependent ratio $r_{c0n}$, the standardized oscillation amplitude $a_n(0)$ can be determined at the position of the exciter on the basis of numerical modal analysis of the natural modes of the bending oscillation modes in order to calculate the mode-dependent ratio $r_{c0n}$ according to:

$$r_{c0n} = \frac{m_E \cdot a_n^2(0)}{\rho_M \cdot \pi \cdot r \cdot w \cdot l}.$$

Thus, only the four coefficients $c_{0n}$, $c_{1n}$, $c_{2n}$, $c_{3n}$ and $c_{4n}$ remain as unknowns, and are to be determined by solving the equation system L6.

The adjustment method 200 according to the invention is shown in FIG. 4. It begins with the setting 205 of a set of measurement conditions from a sequence of different sets of measurement conditions, the measurement conditions being a medium density ($\rho_M$) and a value set of the parameters to which the measuring tube has a cross-sensitivity. These parameters are, in particular, the pressure and the temperature of the medium. This is followed by the excitation 210 of at least three vibration modes of the at least one measuring tube of the density meter and the determination (220) of the eigenfrequencies ($f_n$) of the vibration modes.

The excitation of symmetrical oscillation modes with a symmetrically arranged exciter is unproblematic. In order to also be able to excite antisymmetric oscillation modes, it is possible to arrange the exciter slightly eccentrically, or to feed in an antisymmetric exciter signal via two symmetrically arranged oscillation sensors.

This is followed by checking (225) whether the measurement has been performed with a sufficient number of sets of measurement conditions and, in the event of a negative result of the check, repeating the preceding method steps with a new set from the sequence of the different sets of measurement conditions. If, on the other hand, a sufficient number of measurements has been performed under different measurement conditions, the calculation (230) of the mode-specific coefficients ($c_{0n}$, $c_{1n}$, $c_{2n}$, $c_{3n}$, $c_{4n}$) takes place. These are stored in a data memory of the measuring and operation circuit of the density meter in order to enable the method according to the invention to be carried out for density measurement.

The invention claimed is:

1. A method for operating a density meter, which comprises at least one oscillating measuring tube configured to conduct a medium, an exciter disposed on the measuring tube and configured to excite oscillation modes of the at least one measuring tube according to an exciter signal, and a support body, wherein the at least one measuring tube includes inlet-side and outlet-side end portions, which are connected to the support body at opposite ends thereof, the method comprising:

exciting at least three oscillation modes of the at least one measuring tube;

determining eigenfrequency measurement values of the at least three vibration modes;

determining a density measurement value of the medium taking into consideration a gas load when such is present; and determining a characteristic property of the at least one measuring tube based on the eigenfrequency measurement values of the three oscillation modes.

2. The method according to claim 1, wherein the characteristic property of the at least one measuring tube comprises:

an effective wall thickness value of a wall of the at least one measuring tube;

an effective material removal value of the wall of the at least one measuring tube; or an effective mass deposit value for a mass deposit on the wall of the at least one measuring tube.

3. The method according to claim 2, wherein the effective mass deposit value comprises a deposit thickness value, which is dependent on a density value for a material of the mass deposit.

4. The method according to claim 1, further comprising:

detecting at least one parameter measurement value of at least one parameter to which at least one of the eigenfrequency measurement values has a cross-sensitivity.

5. The method according to claim 4, wherein the at least one parameter is at least one of a temperature of the at least one measuring tube, a temperature of the support body, and a pressure of the medium conducted in the at least one measuring tube.

6. The method according to claim 1, wherein the at least three oscillation modes are selected from a group consisting of a first symmetric oscillation mode, a first antisymmetric oscillation mode, a second symmetric oscillation mode, a second antisymmetric oscillation mode, a third symmetric oscillation mode, and a third antisymmetric oscillation mode.

7. The method according to claim 6, wherein the modes with the lowest modal bending stiffnesses are selected.

8. The method according to claim 7, wherein the first symmetric oscillation mode, the first antisymmetric oscillation mode and the second symmetric oscillation mode are selected.

9. The method according to claim 1, wherein the exciting of the at least three oscillation modes is performed by scanning frequency ranges about each oscillation mode and controlling for a defined phase relationship between an oscillation amplitude and the exciter signal.

10. The method according to claim 1, wherein the determining of the density measurement value comprises solving an equation system of at least three equations of the type:

$$\rho_M = K(c, f_n)[A_n + B'_n(f_n)]$$

wherein $\rho_M$ is the medium density, K describes a correction function for the resonator effect, and c is the speed of sound in the medium, wherein $A_n$ is a mode-specific function, which depends on the characteristic property of the at least one measuring tube, wherein $A_n$ is independent of the respective eigenfrequency of an oscillation mode, and wherein $B'_n$ is a mode-specific function, which depends on the at least one characteristic property of the at least one measuring tube and the respective eigenfrequency of an oscillation mode, wherein $B'_n$ is a quotient of a mode-specific, frequency-independent function $B_n$ and the square of the respective eigenfrequency.

11. The method according to claim 10, wherein the mode-specific functions $A_n$ and $B'_n$ or the quotient comprise linear functions of at least one of the characteristic properties of material removal or deposit thickness.

12. The method according to claim 10, wherein a predetermined value is set for one of two characteristic properties including material removal and deposit thickness.

13. The method according to claim 12, wherein the predetermined value is zero.

14. The method according to claim 10, wherein the function $A_n$ includes a term which is dependent on an arrangement of at least one mass body on the at least one measuring tube, the mass body in particular comprising the exciter.

15. The method according to claim 10, wherein the at least one mass body comprises the exciter.

16. The method according to claim 10, wherein the mode-specific, frequency-independent functions Bn have a dependence on at least one parameter for which the density measurement has cross-sensitivities, wherein the function $B_n$ comprises a linear function of the at least one parameter.

17. A method for adjusting a density meter, which is configured to perform the method according to claim 10, wherein the functions $A_n$ and $B'_n$ or $B_n$ comprise linear functions of mode-specific coefficients, wherein the mode-specific coefficients are determined based on adjustment measurements with at least two media of different densities, wherein the adjustment measurements are performed, in each case, at a plurality of values of parameters to which the density measurement has a cross-sensitivity, and wherein, in the adjustment measurements, the eigenfrequencies of the at least three oscillation modes of the at least one measuring tube are determined, the method comprising:

setting a set of measurement conditions from a sequence of different sets of measurement conditions, wherein the measurement conditions comprise: a medium density; and a value set of the parameters to which the at least one measuring tube has a cross-sensitivity;

exciting the at least three oscillation modes of the at least one measuring tube of the density meter;

determining the eigenfrequencies of the at least three oscillation modes;

checking whether the measurement has been performed for a sufficient number of sets of measurement conditions so as to solve the equation system;

when the number of sets of measurement conditions is not sufficient, repeating the preceding exciting of the at least three oscillation modes and the preceding determining of the eigenfrequencies with a next set from the sequence of the different sets of measurement conditions; and calculating the mode-specific coefficients when the number of sets of measurement conditions is sufficient.

18. A density meter comprising:

at least one oscillating measuring tube configured to conduct a medium;

at least one support body, wherein the at least one measuring tube is mechanically coupled on an inlet side and on an outlet side to the support tube so as to suppress relative movements between an inlet-side end portion and an outlet-side end portion of the at least one measuring tube;

at least one exciter configured to excite the at least one measuring tube to perform bending oscillations;

at least one vibration sensor configured to detect bending oscillations of the at least one measuring tube; and an operation and evaluation circuit configured to supply the exciter with an exciter current and to detect and evaluating measurement signals generated by the at least one vibration sensor, wherein the operation and evaluation circuit is configured to perform the method according to claim 1, and wherein the operation and evaluation circuit includes a data memory in which coefficients determinable with the method according to claim 17 are stored.

19. The density meter according to claim 18, wherein the measuring and operation circuit is configured to receive at least one parameter measurement value of at least one parameter to which the at least one measuring tube vibrations has cross-sensitivities, wherein the at least one parameter is selected from a group consisting of a pressure of the medium conducted in the at least one measuring tube, a temperature of the at least one measuring tube, and a temperature of the support body.

\* \* \* \* \*